3,792,109
ISOMERIZATION OF 1-OLEFINS OR TRANS-OLEFINS TO INTERNAL CIS-OLEFINS
William J. Trepka and John A. Favre, Bartlesville, Okla., assignors to Phillips Petroleum Company
No Drawing. Filed Sept. 11, 1972, Ser. No. 287,738
Int. Cl. C07c 5/24
U.S. Cl. 260—683.2  11 Claims

ABSTRACT OF THE DISCLOSURE

The isomerization of 1-olefins or trans-olefins to internal cis-olefins is accomplished by means of a catalyst system comprising an organolithium compound with a potassium salt of a fatty acid or of an alcohol. For example, 1-butene yields cis-2-butene.

---

The invention relates to a process for converting 1-olefins to internal cis-olefins. In another aspect, the invention relates to a method of converting trans-olefins containing an internal double bond to the cis-isomer. In another aspect, the invention relates to a method of increasing the proportion of cis-isomer in cis/trans mixtures.

BACKGROUND OF THE INVENTION

Cis-isomers, relative to the corresponding trans configuration, are less available, more expensive to obtain, less stable, but more reactive. A cis configuration, being relatively energy-rich, is convertible under thermal or catalytic influence to the lower energy state, i.e., trans form, with the driving force for the conversion being the difference in energy content between the two isomers. Characteristically, cis-isomers exhibit higher octane numbers than corresponding trans-isomers. The cis-isomers in suitable carbon atom range are more desired for motor fuel purposes, or for certain rubber synthesis requirements such as in EPR rubber synthesis.

Ordinarily, isomerization of a 1-olefin yields an internal olefin of trans or predominantly trans configuration, rather than cis, because the trans configuration is the more stable or lower energy form. Internal olefins, i.e., olefins having an internal double bond, generally reflect a mixture predominately trans in configuration.

Generating a cis-isomer in preference to a corresponding trans-isomer is contrary to the usual thermodynamically favored process. For example, one known means of climbing the thermodynamic Appalachian trail is by the absorption of energy from such as ultraviolet irradiation, which can be employed with some compounds, but is not appropriate for the olefins because of their characteristically low ultraviolet absorbance.

Methods to convert cis/trans mixtures to a higher cis content, or to convert 1-olefins to corresponding internal double bond compounds predominantly of the cis configuration, certainly would be desirable.

OBJECTS OF THE INVENTION

It is an object of the invention to provide a method of producing cis-olefins. A further object of the invention is to convert trans-olefins to cis configuration.

Other aspects, objects, and advantages of the present invention will become apparent from a study of the disclosure and the appended claims.

BRIEF SUMMARY OF THE INVENTION

According to the method of our invention, 1-olefins and internal trans-olefins are isomerized in the presence of an organoalkali metal compound-potassium alkoxide or organoalkali metal compound-potassium salt of a fatty acid catalyst system to yield olefin mixtures high in the cis-isomer configuration.

DETAILED DESCRIPTION OF THE INVENTION

The process of our invention can be applied to terminal olefins, i.e., 1-olefins, to yield internal olefins of preferentially cis structure, e.g., 1-butene yields cis-2-butene preferentially. The process can be applied to internal olefins so as to convert at least a portion of the trans configuration to cis configuration by isomerization. A cis/trans mixture can be enriched in cis content, such as a 4/5 cis/trans 2-butene mixture can be converted to a 6/4 cis/trans mixture.

OLEFINS

Olefins suitable for our reaction are any of the linear or branched olefins which by our process can be increased as to the cis isomer content. These linear or branched olefins can contain cycloalkyl groups. Presently preferred are those 1-olefins or internal olefins containing 4 to 20 carbon atoms per molecule, since these are more readily available. On a commercial basis, those olefins of 4 to 12 carbon atoms presently are of more commercial interest in the integrated oil refining-chemical processing plant more and more frequently termed a petrocomplexity.

Examples of suitable olefins include 1-butene, 2-butene, 1-octene, 3-nonene, 3-methyl-4-ethyl-6-octene, 2,4,6,8-tetramethyl-7-dodecene, 1-cyclohexyl-3-tetradecene, either as the trans form, or as cis/trans mixtures, and the like. Of course, some 1-olefins are not subject to double bond isomerization, such as 3,3-dimethyl-1-butene, as well as some internal olefins cannot undergo double bond isomerization, such as 2,2,5,5-tetramethyl-3-hexene. Thus, our olefins can be defined as those linear or branched olefins which can undergo double bond isomerization. The term olefin is used generically and is not limited to monoolefins, since it is apparent that longer chain diolefins in which the double bonds are fairly far apart also could undergo the double bond isomerization according to our invention.

CATALYST SYSTEM

We have discovered a unique catalyst combination that enables us to make the conversion of trans to cis configuration effectively and readily. Neither catalyst entity alone is effective. The catalyst system which we employ in the process of our invention represents an admixture of (I) an organoalkali metal compound and (II) a potassium alkoxide or a potassium salt of a fatty acid.

Organoalkali metal compounds can be represented by $RM_x$ in which M is an alkali metal and is lithium, sodium, potassium, rubidium, or cesium. Presently preferred of these is lithium. In the formula, R represents a hydrocarbon radical which can be alkyl including cycloalkyl, and $x$ an integer of 1 to 4, with R having a valence equal to $x$. Presently preferred are those $RM_x$ compounds containing up to 20 carbon atoms, although this is more a matter of convenience rather than a limitation of operability with regard to higher molecular weight species. R also can be an aromatic group, including fused ring aromatic groups, containing 6 to 16 carbon atoms. Alkylated fused rings may not be suitable in some instances in view of the propensity of benzylic hydrogen atoms toward metallation.

Examples of organoalkali metal compounds include methyllithium, isopropyllithium, n-butyllithium, tert-octyllithium, n-decyllithium, cyclohexyllithium, 4-butylcyclohexyllithium, 4 - cyclohexylbutyllithium, dilithiomethane, 1,10-dilithiodecane, 1,20 - dilithioeicosane, 1,4 - dilithiocyclohexane, 1,3,5 - trilithiopentane, 1,3,5 - trilithiocyclohexane, 1,3,5,8 - tetralithiodecane, 1,5,10,20 - tetralithioeicosane, 1,2,4,6-tetralithiocyclohexane, 1,4 - dilithiobenzene, 1-lithionaphthalene, 9,10-dilithioanthracene, 1-lithiochrysene and similar compounds in which other alkali metals mentioned are represented. Less preferred are such as dilithiobutadiene, dilithioisoprene and the like which contain points of unsaturation.

Potassium alkoxides include potassium salts of monohydric, dihydric, and polyhydric alcohols. These can be represented by $(KO)_yR'$ in which $R'$ represents a hydrocarbon radical, preferably secondary or tertiary, and preferably aliphatic, the carbon atom number of which radical is not particularly limited except by convenience, and $y$ is an integer of 1 to 3. Presently preferred are R groups containing 3 to 12 carbon atoms, alkyl including cycloalkyl, or mixed types such as cycloalkylalkyl, aralkyl, and the like. Primary potassium alkoxides can also be used with suitable pairing of $R'$ and solvent to overcome the relatively low solubility of such $(KO)_yR'$ compounds.

Exemplary compounds include potassium isopropoxide, potassium sec-butoxide, potassium tert-butoxide, potassium tert-pentyloxide or potassium tert-amyloxide, potassium cyclohexyloxide, potassium 4-ethylcyclohexyloxide, potassium 5-cyclohexylhexyloxide, and potassium salts of glycerol, glycol, 1,6-hexanediol, and other polyhydric alcohols, and the like.

Potassium salts of fatty acids also can be employed. These can be any of the available monobasic organic acids of this class. These can be represented by $KOOCR''$ in which $R''$ represents an alkyl radical of 8–22, preferably 12–22 carbon atoms, for example potassium laurate, potassium stearate and potassium docosanoate.

The ratio of (I) organoalkali metal compound to (II) potassium alkoxide or to potassium salt of fatty acid can range widely, so long as at least each is present in an amount effective for the conversion desired. The particular ratio may vary depending on the particular olefins, temperatures employed, operating conditions, and the like, and whether a solvent is employed. We suggest a range of about 0.1:1 to 10:1 mole ratio of alkali metal:potassium, presently prefer a ratio of 0.9:1 to 1.1:1, and most preferred at present is a mole ratio of about 1:1.

The amount of catalyst employed is the amount suitable for the degree of conversion desired under the operating conditions chosen. A mole ratio of total catalyst:olefin can vary considerably since an excess of catalyst does not appear to act unfavorably, and relatively low amounts of catalyst may simply require longer contact or reaction times, or possibly recycle. However, we presently believe a mole ratio range of about 10:1 to 0.1:1 catalyst:olefin to be satisfactory for most purposes, and presently prefer a range of about 4:1 to 0.5:1.

The olefin to be isomerized according to the process of our invention, in order to convert it to or enrich the cis content thereof, itself can act as reaction solvent with the need of added solvent or diluent. However, where desired, an added solvent or diluent can be employed such as cyclohexane, methylcyclohexane, benzene, isooctane, n-heptane, and the like, and other saturated suitable aliphatics, and the like. Alkylated aromatics presently should be avoided because of possible reactivity toward the catalyst system. Of course, mixed solvents or diluents can be employed. Solvents can be used to transport the reactants including the olefin or catalyst system or both to the reaction zone, depending upon type of reactor employed, and whether or not any additional solvent or diluent is employed for the isomerization reaction itself.

On the basis of total weight of catalyst-plus-olefin present versus total weight of solvent or solvents to be employed, there appears to be no particular limit as to the amount of solvent used. Large quantities of solvent mean large quantities of unreacted material to handle and ultimately separate. Of course, due to the general reactivity of the cis configuration olefin as opposed to the trans form, strenuous separations applied to the converted solvent diluted product may be undesirable. Where a solvent is employed, the percentage concentration of catalyst plus olefin in the solution can range from 1 to 100. Presently preferred is a range of up to 10 percent such as 2 to 10 percent.

Reaction temperatures can be substantially atmospheric temperature, though the invention is operable at any convenient operating temperature. Suggested ranges are about 0 to 70° C., with the presently preferred range being about 15 to 35° C. The reaction is carried out in the presence of an inert atmosphere using nitrogen, helium, argon, or nonreactive, gaseous hydrocarbons such as methane or ethane, or the like. The reaction can be carried out at any suitable pressure sufficient to maintain substantially liquid operation including superatmospheric pressures, although atmospheric pressure is suitable and convenient.

EXAMPLES

Particular species employed, whether of olefin or of catalyst components, particular ratios, amounts, conditions, are intended to be illustrative and not limitative of the reasonable and proper scope of our invention.

Example I

Equimolar amounts of n-butyllithium in n-heptane solution and potassium tert-pentyloxide in cyclohexane solution were combined at about 25 to 28° C. under inert nitrogen atmosphere. The olefin to be isomerized was introduced in an amount equimolar to either metal compound, employing 5 ml. cyclohexane as solvent per millimole of olefin, and, when desired, a paraffin hydrocarbon such as 2-methylpropane to serve as an internal standard for gas-liquid chromatography. The admixture was agitated for 1.5 hours at 25 to 28° C., and the reaction mixture then quenched by the addition of ethanol. The composition of the product mixture was determined by gas-liquid chromatography.

Compositions of feedstocks and of end products for various runs are shown in Table I:

TABLE I

| Run number | Feedstock (mmoles) | | | Product isomerized (mmoles) | | |
|---|---|---|---|---|---|---|
| | Butene-1 | trans-Butene-2 | cis-Butene-2 | Butene-1 | trans-Butene-2 | cis-Butene-2 |
| 1 | 1.007 | 0 | 0 | 0.723 | 0 | 0.226 |
| 2 | 0 | 0.520 | 0.435 | 0.067 | 0.394 | 0.561 |

The above runs clearly illustrate the effective conversion of a 1-olefin to the corresponding cis isomer, and the enrichment of the cis content of a cis/trans mixture, according to the process of our invention.

Example II

Further runs were made following the general procedure and conditions of Example I in order to test the activity of either catalyst component alone, as well as the combined catalyst components. Results obtained are shown in Table II:

TABLE II

| Run number | BuLi,[a] mmoles | KTP[b] | n-Butene-1 | Mole percent effluent | | |
|---|---|---|---|---|---|---|
| | | | | n-Butene-1 | trans-Butene-2 | cis-Butene-2 |
| 3 | 1 | 0 | 1 | 100 | 0 | 0 |
| 4 | 0 | 1 | 1 | 100 | 0 | 0 |
| 5 | 1 | 1 | 1 | 76.5 | 0 | 23.5 |
| | | | | trans/cis-Butene-2 [c] | | |
| 6 | 1 | 0 | 1 | 0 | 52.1 | 47.9 |
| 7 | 0 | 1 | 1 | 0 | 53.3 | 46.7 |
| 8 | 1 | 1 | 1 | 9.3 | 37.2 | 53.4 |

[a] Butyllithium.
[b] Potassium tert-pentyloxide.
[c] 52.9% trans and 47.1% cis in starting mixture.

The above runs clearly show that it is the combined catalyst according to our invention that produces the cis product. Either catalyst system component alone had essentially no effect.

EXAMPLE III

Further tests were made employing the general procedure and conditions of Example I, employing pentenes in order to observe conversion thereof according to the process of our invention. Results are shown in Table III.

TABLE III

| Run number | Olefin | BuLi/KTP, mmoles | Effluent products, mole percent | | | Cis/trans ratio |
|---|---|---|---|---|---|---|
| | | | Pentene-1 | trans-Pentene-2 | cis-Pentene-2 | |
| 9 | Pentene-1 | 0/0 | 100 | 0 | 0 | |
| 10 | do | 1/1 | 90.3 | 2.2 | 7.5 | 3.4/1 |
| 11 | Pentene-2 | 0/0 | 0 | 72.5 | 27.4 | 0.4/1 |
| 12 | do | 1/1 | 8.1 | 50.2 | 41.7 | 0.8/1 |

Run 10, as compared to Run 9, reflects good conversion of the starting pentene-1 to pentene-2 products with a relatively high ratio of 3.4:1 cis:trans.

Run 11 and Run 12 both used a cis/trans admixture of pentene-2; Run 12 reflects a doubling of the ratio of cis:trans from 0.4:1 to 0.8:1 by the practice of our invention.

Example IV

Improving the cis proportion in olefin admixtures for purposes such as fuel components is desirable as shown by data in Table IV.

TABLE IV a

| | Octane number | |
|---|---|---|
| | Research | Motor |
| 4-methyl-cis-2-pentene | 99.7 | 84.5 |
| 4-methyl-trans-2-pentene | 98.0 | 82.6 |
| 3-methyl-cis-2-hexene | 92.4 | 80.0 |
| 3-methyl-trans-2-hexene | 91.5 | 97.6 | a Data from "Reference Data for Hydrocarbons and Petro-Sulfur Compounds," Phillips Petroleum Company, Special Products Division, Bulletin No. 521, Copyright 1962, revised 1969.

The cis-isomers, thusly, can provide higher octane fuels than the corresponding trans isomers.

Other modifications and alterations of this invention will become apparent to those skilled in the art from the foregoing discussion and examples and it should be understood that this invention is not to be unduly limited thereto.

We claim:

1. A method of converting an olefin to a cis configuration which comprises contacting at least one olefin capable of undergoing double bond isomerization with a catalyst system of (I) organoalkali metal compound and (II) potassium salt of a fatty acid or alcohol.

2. The process according to claim 1 wherein said olefin is a 1-olefin or internal olefin containing 4 to 20 carbon atoms per molecule.

3. The process according to claim 2 wherein said organoalkali metal compound can be represented by $RM_x$ wherein M is lithium, sodium, potassium, rubidium, or cesium, R is a hydrocarbon radical of up to 20 carbon atoms per group, and $x$ is an integer of 1 to 4;

said potassium salt of an alcohol can be represented by $(KO)_y R'$ wherein R represents a hydrocarbon radical of 3 to 12 carbon atoms, and $y$ is an integer of 1 to 3; and said potassium salt of a fatty acid can be represented by $KOOCR''$ wherein R represents an alkyl radical of 8 to 22 carbon atoms.

4. The process according to claim 3 which employs a mole ratio of alkali metal:potassium of about 0.9:1 to 1.1:1.

5. The process according to claim 4 which employs a mole ratio of catalyst system:olefin of about 10:1 to 0.1:1.

6. The process according to claim 5 wherein the process is conducted at temperatures of about 0 to 70° C. in the presence of an inert atmosphere at pressures sufficient to maintain substantially liquid operations.

7. The process according to claim 6 further employing an inert diluent other than the olefin itself.

8. The process according to claim 6 wherein said olefin is butene-1, said organoalkali metal compound is n-butyllithium, said potassium compound is potassium tert-pentyloxide.

9. The process according to claim 6 wherein said olefin is a mixture of trans/cis-butene-2, and said organoalkali metal compound is n-butyllithium, said potassium compound is potassium tert-pentyloxide.

10. The process according to claim 6 wherein said olefin is pentene-1, and said organoalkali metal compound is n-butyllithium, said potassium compound is potassium tert-pentyloxide.

11. The process according to claim 6 wherein said olefin is pentene-2, and said organoalkali metal compound is n-butyllithium, said potassium compound is potassium tert-pentyloxide.

References Cited

UNITED STATES PATENTS

| 3,185,744 | 5/1965 | Broaddus | 260—683.2 |
| 3,270,084 | 8/1966 | Schriesheim et al. | 260—683.2 |
| 3,309,410 | 3/1967 | Schriesheim et al. | 260—666 |
| 3,542,896 | 11/1970 | Butte | 260—683.2 |

OTHER REFERENCES

Morton et al., J. Org. Chem., vol. 20, pp. 839–844, 1955.

DELBERT E. GANTZ, Primary Examiner

C. E. SPRESSER, Jr., Assistant Examiner

U.S. Cl. X.R.

260—666 A